United States Patent
Wagner

Patent Number: 6,021,156
Date of Patent: Feb. 1, 2000

[54] APPARATUS AND METHOD FOR IMPROVING SIGNAL-TO-JAMMING RATIO IN A SPREAD SPECTRUM RECEIVER

[75] Inventor: Gary L. Wagner, Menlo Park, Calif.

[73] Assignee: Trimble Navigation Limited, Sunnyvale, Calif.

[21] Appl. No.: 08/936,140

[22] Filed: Sep. 24, 1997

[51] Int. Cl.$^7$ .............................. H04B 15/00; H04B 1/69
[52] U.S. Cl. ......................... 375/200; 375/346; 455/296; 327/310
[58] Field of Search ..................................... 375/200, 345, 375/346; 455/232.1, 234.1, 250.1, 296, 308; 330/254, 278; 327/310, 551

[56] References Cited

U.S. PATENT DOCUMENTS

| | | | |
|---|---|---|---|
| 4,739,518 | 4/1988 | Bickley et al. | 455/296 |
| 5,084,899 | 1/1992 | Harrington | 375/200 |
| 5,465,272 | 11/1995 | Smith | 375/295 |
| 5,808,512 | 9/1998 | Bainvoll et al. | 330/151 |

*Primary Examiner*—Young T. Tse
*Attorney, Agent, or Firm*—David R. Gildea

[57] ABSTRACT

A jamming signal cancellation method and apparatus for removing an undesired in-band CW jamming signal from a desired spread spectrum signal. The jamming cancellation apparatus includes a limiter, a summer, and a feedback loop. The feedback loop includes the summer, a harmonic filter, a mixer, a loop/filter amplifier, and an adjustable gain control (AGC). The limiter limits the waveform of the input signal and issues a limited signal to the AGC and the mixer. The AGC controls the amplitude of the limited signal and passes a controlled amplitude signal to the summer. The summer takes a difference between the input signal and the controlled amplitude signal and passes a difference signal to the filter. The filter filters the harmonics that were created by the limiter and passes an output signal to the mixer. The mixer multiplies the filtered signal by the limited signal to provide an error signal that is proportional to the amplitude of the fundamental frequency in the difference signal. The error signal is then passed through the loop/filter amplifier and used in the AGC to drive the amplitude of the controlled amplitude signal to equal the amplitude of the waveform of the input signal, effectively eliminating the CW jamming signal from the output signal, and thereby improving the signal-to-jamming ratio of the output signal with respect to the input signal.

15 Claims, 4 Drawing Sheets

APPARATUS AND METHOD FOR IMPROVING SIGNAL-TO-JAMMING RATIO IN A SPREAD SPECTRUM RECEIVER

BACKGROUND OF THE INVENTION

1. Field of the Invention

The invention relates generally to spread spectrum signal receivers and more particularly to a method and apparatus for improving signal-to-jamming ratio for a spread spectrum signal in the presence of a CW jamming signal.

2. Description of the Prior Art

Spread spectrum signals are used in global positioning system (GPS), global orbiting navigational system (GLONASS), and code division multiple access (CDMA) wireless communication systems. It is often the case that these signals must be received in the presence of a CW jamming signal. Depending upon the ratio of the power in the desired signal to the power in the jamming signal and the jamming tolerance of the signal receiver, the CW jamming signal may degrade the performance of the receiver or even make it inoperable. The term "CW" is used for describing any jamming signal whose modulation spectrum is much less than the modulation spectrum of the spread spectrum signal even though the jamming signal is not truly a "constant wavelength". An out-of-band CW jamming signal may be effectively eliminated by traditional filtering methods. However, an in-band CW jamming signal is more difficult to eliminate. One of the benefits of spread spectrum signal systems over traditional non-spread spectrum systems is that an in-band CW jamming signal is spread in frequency by a de-spreading process in a spread spectrum receiver, thereby improving the performance of the spread spectrum receiver in the presence of the jamming signal. Further improvement of the spread spectrum receiver is available by using multi-bit digitizing of the incoming signal combination. However, multi-bit digitizing is more complex and a very large in-band CW jamming signal may still degrade the performance of the spread spectrum receiver by overwhelming the de-spreading process. Theoretically, a notch filter having capacitive and/or inductive filter elements may be used to reduce the in-band CW jamming signal. However, the notch filter may need to be extraordinarily narrow and deep in order to be effective and may need to be tunable in operation to the particular frequency of the CW jamming signal that is present. Such notch filter is difficult and expensive to realize in practice.

BRIEF SUMMARY OF THE INVENTION

It is therefore an object of the present invention to provide a practical method and apparatus for removing a large undesired in-band CW jamming signal from a desired spread spectrum signal.

Briefly, in a preferred embodiment, a jamming cancellation apparatus of the present invention uses a feedback loop for adjusting the amplitude of a limited signal version of the input signal so that limited signal has a fundamental component that exactly matches the amplitude of the input signal. The jamming signal is then removed by subtracting the limited signal from the input signal. Because the amplitude of the input signal is determined by the jamming signal and not the spread spectrum signal, the spread spectrum signal is mostly unaffected by subtracting the limited signal.

A preferred embodiment of the jamming cancellation apparatus includes a limiter, a summer, and a feedback loop. The feedback loop includes the summer, a harmonic filter, a mixer, a loop/filter amplifier, and an automatic gain control (AGC). The limiter limits the waveform of the input signal and issues a limited signal to the AGC and the mixer. The AGC controls the amplitude of the limited signal and passes a controlled amplitude signal to the summer. The summer takes a difference between the input signal and the controlled amplitude signal and passes a difference signal to the filter. The filter filters the harmonics that were created by the limiter and passes an output signal to the mixer. The mixer multiplies the filtered output signal by the limited signal having a delay to compensate for delay in the filter. The output of the mixer is an error signal that is proportional to the amplitude of the fundamental frequency in the difference signal. The error signal is then passed through the loop/filter amplifier and used by the AGC to drive the amplitude of the controlled amplitude signal to equal the amplitude of the waveform of the input signal, effectively eliminating the CW jamming signal from the output signal, and thereby improving the signal-to-jamming ratio of the output signal with respect to the input signal. A spread spectrum receiver of the present invention includes RF circuitry, the jamming cancellation apparatus, and a despreader/decoder.

An advantage of the present invention is that an in-band CW jamming signal is eliminated from a spread spectrum signal in a practical way without the use of multi-bit digitization and/or capacitive or inductive elements for notch filtering.

These and other objects and advantages of the present invention will no doubt become obvious to those of ordinary skill in the art after having read the following detailed description of the preferred embodiments which are illustrated in the various figures.

DETAILED DESCRIPTION OF THE INVENTION

Figure 1:
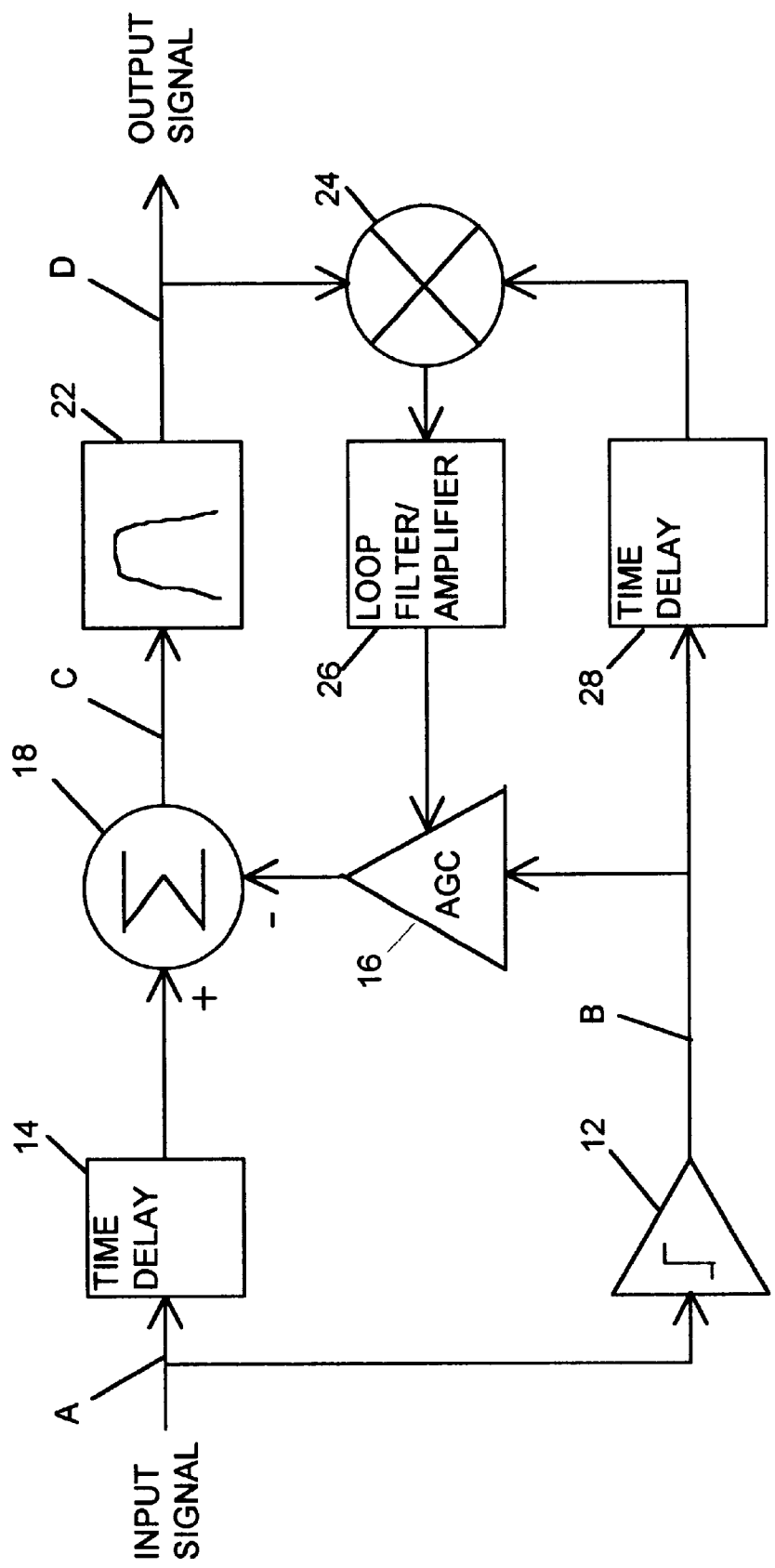
FIG. 1 is a block diagram of a jamming cancellation apparatus of the present invention.

FIG. 1 is a block diagram of a jamming cancellation apparatus of the present invention referred to by the general reference number 10. The jamming cancellation apparatus 10 receives an input signal including a desired spread spectrum signal and an undesired in-band CW jamming signal at point A. In a preferred embodiment the input signal has been band limited as closely as possible to the frequency band of the spread spectrum signal. The input signal is received by a limiter 12 and a time delay circuit 14. The limiter 12 amplifies and limits the waveform of the input signal to provide a limited signal at point B. An automatic gain control (AGC) 16 is coupled to the limiter 12 for adjusting the amplitude of the limited signal according to a feedback signal and passing a limited controlled amplitude signal to a negative input of a summer 18. The time delay circuit 14 delays the input signal by a time delay that is equal to the time delay in the limiter 12 and AGC 16 and passes the delayed input signal to a positive input of the summer 18.

The time delay circuit 14 may be included in the summer 18. A feedback loop using a filter 22, a mixer 24, and a loop/filter amplifier 26 provides the feedback signal to the AGC 16 for adjusting the amplitude of the fundamental frequency of the controlled amplitude signal to have an amplitude that is equal to the amplitude of the waveform of the delayed input signal within the frequency band of the input signal.

The summer 18 subtracts the controlled amplitude signal from the delayed input signal to provide a difference signal at point C. The difference signal is filtered by the filter 22 to reduce the harmonics of the limited signal that are passed in an inverted form through the summer 18. The filter 22 issues an output signal at point D that is passed to a mixer 24. The mixer 24 multiplies the output signal by a limited signal from point B that has been delayed by time delay circuit 28 by a time equal to the time delay in the AGC 16, the summer 18, and the filter 22. The error signal is passed to the loop/filter amplifier 26. The loop/filter amplifier 26 provides the gain, poles, and zeros to stabilize the gain and phase of the feedback loop and passes the feedback signal to the AGC 16. The action of the loop is to force the error to zero, thereby canceling the jamming signal in the output signal at point D.

There are several ways that the structural blocks of the apparatus 10 may be implemented. In a preferred embodiment, the limiter 12 uses a differential amplifier. The AGC 16 may be an electronically variable amplifier or attenuator or may be built as a part of the limiter 12 by using an electronically variable limit. The mixer 24 uses a Gilbert Cell. In a simplified embodiment, the jamming cancellation apparatus 10 is constructed with the limiter 12, the time delay circuit 14, the AGC 16, and the summer 18 where the AGC 16 is replaced by an amplitude adjuster having an adjustable gain or attenuation without the use of the feedback loop. Such amplitude adjuster may be adjusted manually or electronically. An example of such amplitude adjuster that is adjusted manually is a variable resistor.

Figure 4:
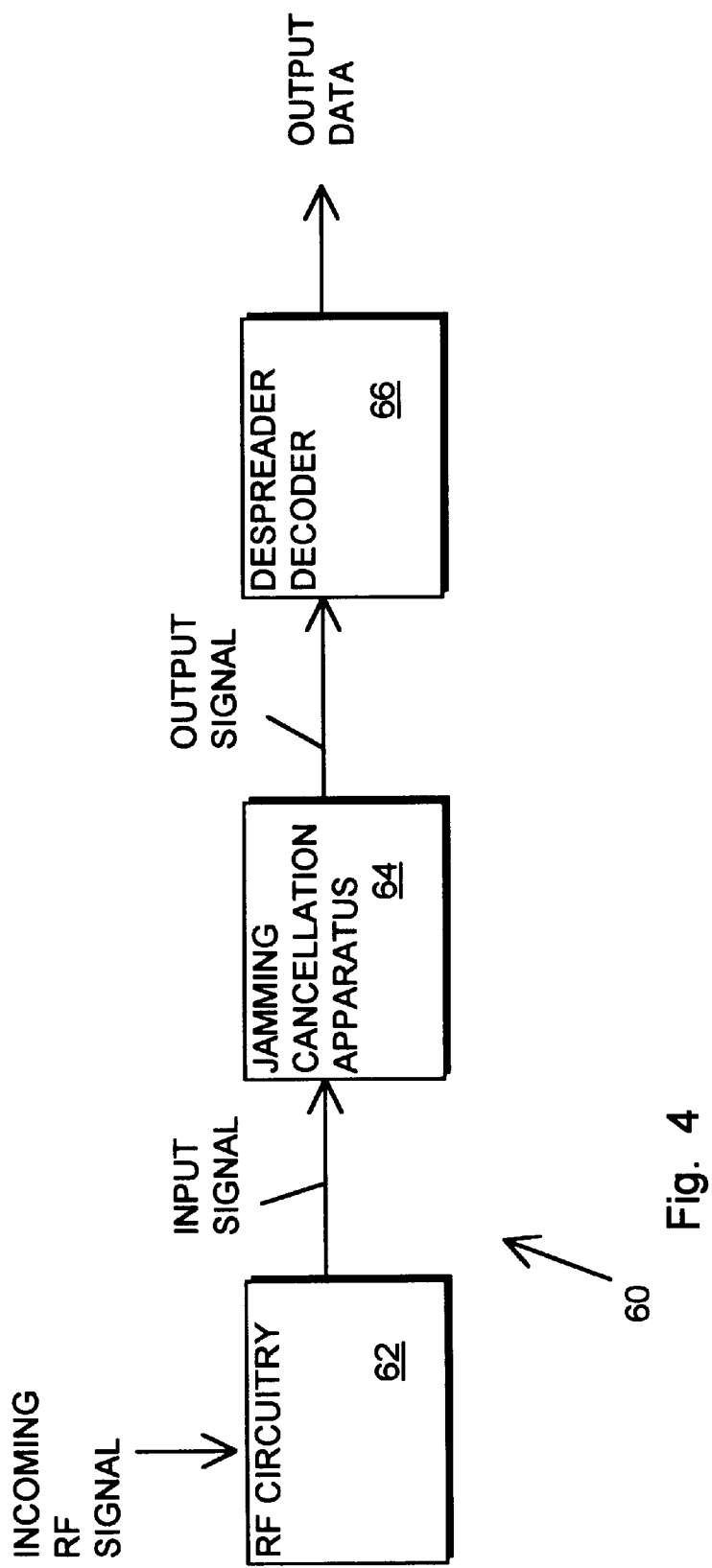
FIG. 4 is a block diagram of a signal receiver of the present invention having the jamming cancellation apparatus of FIG. 1.

The jamming cancellation apparatus 10 may be used in a global positioning system (GPS), Global Orbiting Navigational SyStem (GLONASS), code division multiple access (CDMA) communications receiver, or other spread spectrum receiver illustrated by the spread spectrum receiver 40 (FIG. 4).

Figure 2A:
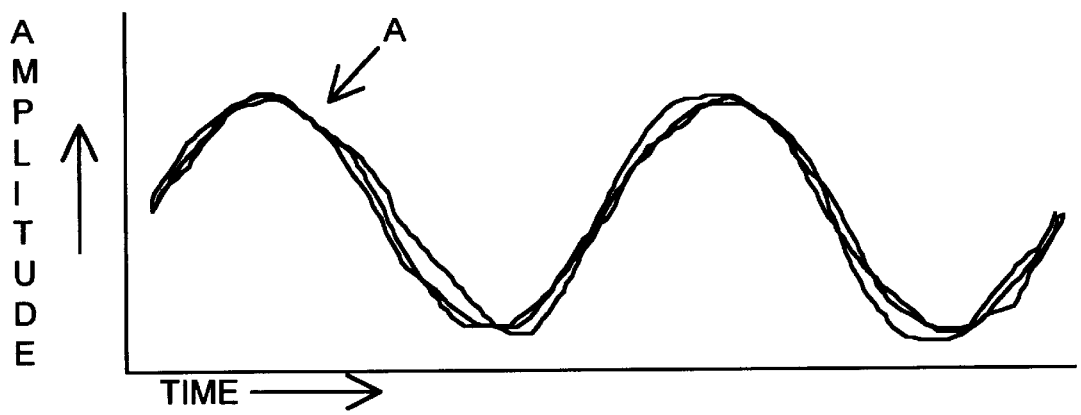
FIGS. 2a–c illustrate time domain signals in the jamming cancellation apparatus of FIG. 1.
Figure 2B:
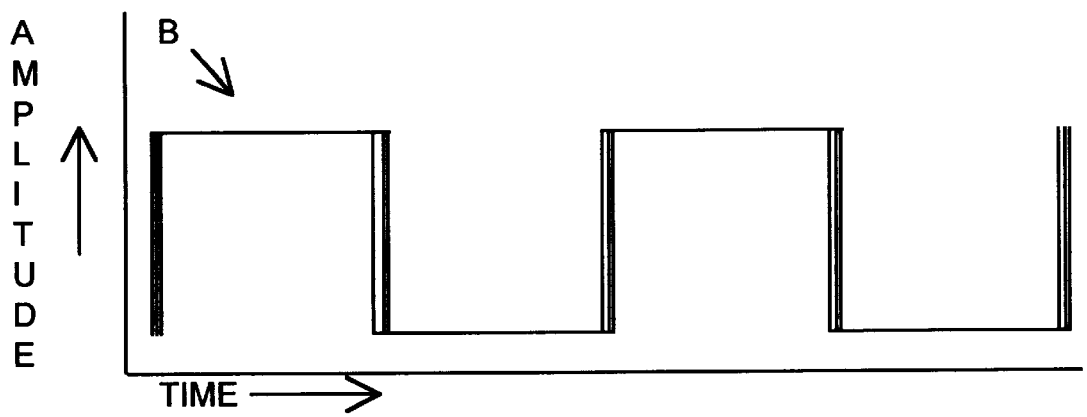
Figure 2C:
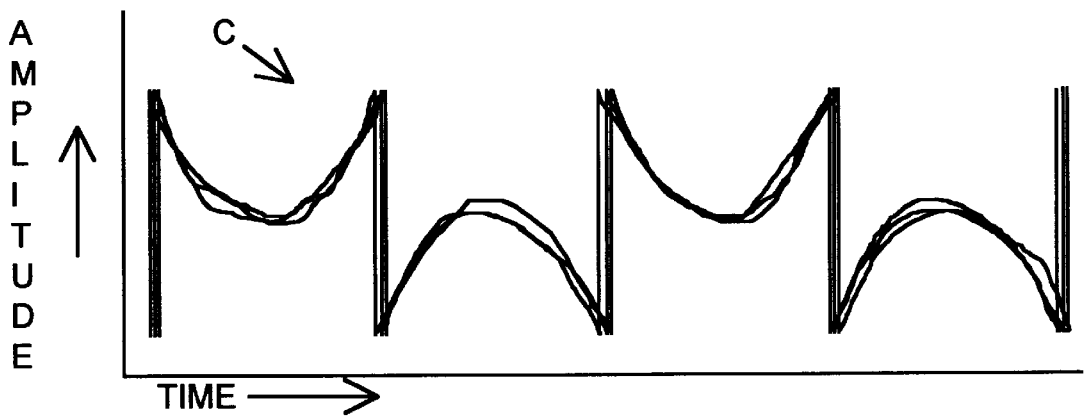

FIGS. 2a, 2b, and 2c are representative illustrations of the waveforms of the signals in the time domain at the points A, B, and C, respectively, of the block diagram of FIG. 1. The same time scale is used for the signals at each of the points A, B, and C. The variations in the waveforms of each of the signals represents noise variations between repetitions of the signals when the time scale is triggered by the jamming signal. The input signal at the point A shows a large sinusoidal waveform for the jamming signal and variations representing noise. The desired spread spectrum signal is difficult to see in the time domain at the point A and to the degree it can be seen, it looks like the noise variations. The limited signal at the point B shows that the jamming signal has been limited to appear as a square wave with noise variations showing at the transitions. The square wave includes the fundamental and harmonics of the jamming signal. The difference signal at the point C shows that the fundamental of the jamming signal has been eliminated but the harmonics created by the limiter 12 remain. These harmonics are then filtered by the filter 22.

Figure 3A:
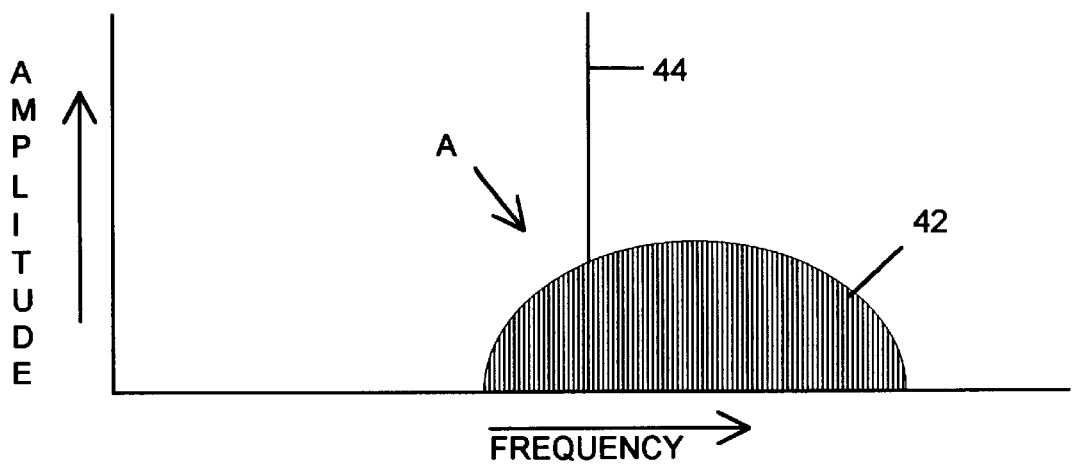
FIG. 3a–c illustrate frequency domain signal in the jamming cancellation apparatus of FIG. 1.
Figure 3B:
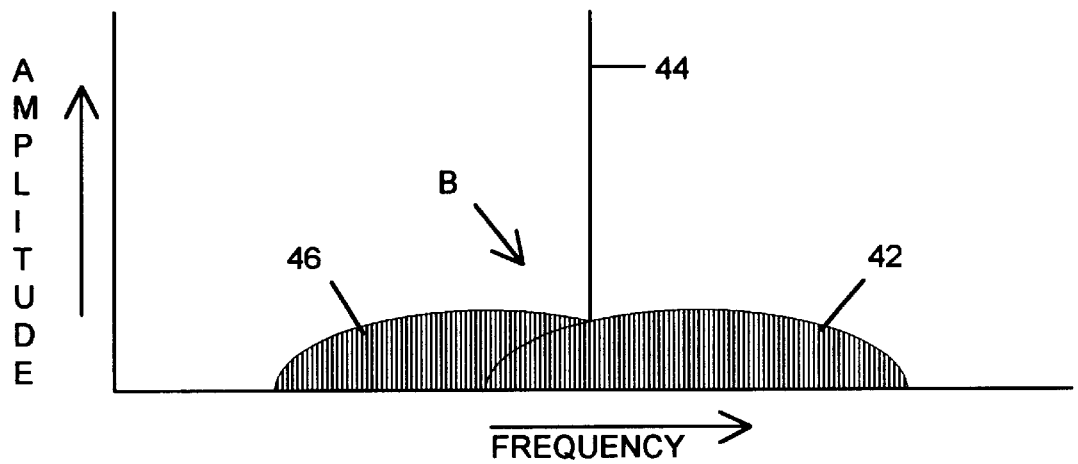
Figure 3C:
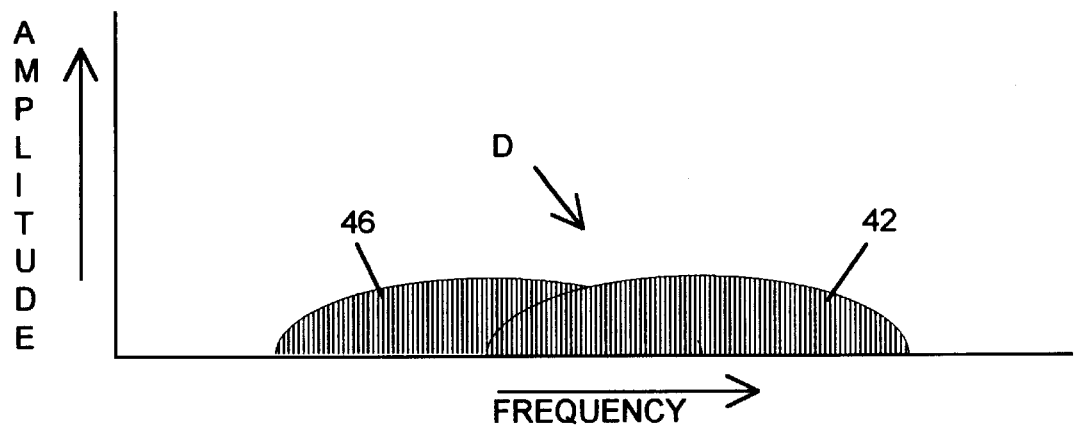

FIGS. 3a, 3b, and 3c are representative illustrations of the waveforms of the signals in the time domain at the points A, B, and D, respectively, of the block diagram of FIG. 1. The same frequency scale is used in FIGS. 3a–c for the signals at each of the points A, B, and D. The input signal at the point A shows a wide spectrum for the desired spread spectrum signal 42 and a narrow spectrum for the jamming signal 44. The spectrum of the limited signal at the point B shows the spread spectrum signal 42 and a mirror signal 46 that mirrors the signal 42 about the jamming signal 44. The ratio of the spectral components of the spread spectrum signal 42 to the jamming signal 44 at point B is six decibels lower than at point A. The output signal at the point D again shows the spectrum of the spread spectrum signal 42 and the mirror signal 46 after the harmonics that were created by the limiter 12 have been filtered by the filter 22. The spectrum of the jamming signal 44 has been eliminated from the output signal at the point D. Because the spectrum components of the mirror signal 46 are not correlated with the spectrum components of the desired spread spectrum signal 42, the effect of the mirror signal 46 upon the performance of a typical spread spectrum receiver is minimal.

FIG. 4 is a block diagram of a spread spectrum signal receiver of the present invention referred to by the general reference number 60. The receiver 60 includes radio frequency (RF) circuitry 62 for receiving an incoming RF signal including a desired spread spectrum signal and an undesired in-band CW jamming signal. The RF signal can be characterized as having a signal-to-jamming ratio for the ratio of the power in the spread spectrum signal to the power in the jamming signal. In a preferred embodiment, the RF circuitry 62 amplifies, downconverts, and filters the RF signal to provide a first intermediate signal. Of course, there may be other intermediate signals within the RF circuitry 62. The jamming cancellation apparatus 10 receives the first intermediate signal as its input signal. It is important that the RF circuitry 62 have sufficient dynamic amplitude range to pass the waveform in the first intermediate signal without significant amplitude limiting. Where the frequency of the RF signal is low enough the downconverter may be eliminated and the jamming cancellation apparatus 10 may be operated at the frequency of the RF signal. The jamming cancellation apparatus 10 effectively eliminates the jamming signal as described above and passes the desired spread spectrum signal 42 and mirror signal 46 in its output signal as a second intermediate signal to a despreader/decoder 64. The despreader/decoder 64 de-spreads the spread spectrum signal 42 to obtain a data signal and de-codes the data signal in order to obtain the data that was transmitted with the RF signal. The despreading process spreads the frequency components of the mirror signal 46 so that they look like background noise. In an application such as global positioning system, the noise created by the mirror signal 46 has little or no effect on system performance because it is lower than the existing background noise. However, because some of the power of the desired spread spectrum signal 42 was converted to the mirror signal 46, the apparatus 10 decreases the signal-to-noise ratio (SNR) of the desired spread spectrum signal 42 by a few decibels when the undesired jamming signal 44 is present. Actual tests and computer simulations for a GPS receiver have shown the SNR degradation to be less than three decibels. When the jamming signal 44 is not present the jamming cancellation apparatus 10 should be bypassed. Embodiments of the receiver 60 may be used for receiving the RF signal for the GPS, GLONASS, CDMA communications, or other spread spectrum systems.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for improving signal-to-jamming ratio for a signal having a desired spread spectrum signal and an undesired in-band CW jamming signal, comprising:

amplitude limiting a waveform of an input signal for providing a limited signal having harmonics of said waveform;

adjusting an amplitude of said limited signal according to a feedback signal for providing a controlled amplitude signal having a fundamental frequency having an amplitude equal to an amplitude of said waveform, said limited signal including said harmonics;

differencing said controlled amplitude signal and said input signal for providing a difference signal;

filtering said difference signal for reducing said harmonics of said limited signal for providing an output signal; and multiplying said output signal and a delayed representation of said limited signal for providing said feedback signal, whereby said signal-to-jamming ratio of said output signal is improved with respect to said input signal.

2. The method of claim 1, wherein:

the step of adjusting said amplitude includes a step of coupling said difference signal through a feedback loop for adjusting said amplitude.

3. The method of claim 1, wherein:

said spread spectrum signal includes a code division multiple access (CDMA) signal.

4. The method of claim 1, wherein:

said spread spectrum signal includes a global positioning system (GPS) signal.

5. The method of claim 1, wherein:

said spread spectrum signal includes a global orbiting navigational system (GLONASS) signal.

6. A jamming signal cancellation apparatus for improving signal-to-jamming ratio for a signal having a desired spread spectrum signal and an undesired in-band CW jamming signal, comprising:

a limiter for amplitude limiting a waveform of an input signal for providing a limited signal having harmonics of said waveform;

an amplitude adjuster coupled to the limiter for adjusting an amplitude of said limited signal according to a feedback signal for providing a controlled amplitude signal having a fundamental frequency having an amplitude equal to an amplitude of said waveform, said limited signal including said harmonics;

a summer for differencing said controlled amplitude signal and said input signal for providing a difference signal;

a filter for filtering said difference signal and reducing said harmonics of said limited signal for providing an output signal; and a mixer for multiplying said output signal and a delayed representation of said limited signal for providing said feedback signal, whereby said signal-to-jamming ratio of said output signal is improved with respect to said input signal.

7. The apparatus of claim 6, further including:

a feedback loop for coupling said difference signal to the amplitude adjuster for adjusting said amplitude.

8. The apparatus of claim 6, wherein:

said spread spectrum signal is a code division multiple access (CDMA) signal.

9. The apparatus of claim 6, wherein:

said spread spectrum signal is a global positioning system (GPS) signal.

10. The apparatus of claim 6, wherein:

said spread spectrum signal includes a global orbiting navigational system (GLONASS) signal.

11. A spread spectrum signal receiver for improving signal-to-jamming ratio of an incoming signal having a desired spread spectrum signal and an undesired in-band CW jamming signal, comprising:

radio frequency circuitry for receiving said incoming signal and issuing a representative first intermediate signal;

a jamming signal cancellation apparatus including a limiter for amplitude limiting a waveform of said first intermediate signal for providing a limited signal having harmonics of said waveform, an amplitude adjuster coupled to said limiter for adjusting an amplitude of said limited signal according to a feedback signal for providing a controlled amplitude signal having a fundamental frequency having an amplitude equal to an amplitude of said waveform, said limited signal including said harmonics, a summer for differencing said controlled amplitude signal and said first intermediate signal for providing a difference signal, a filter for filtering said difference signal and reducing said harmonics of said limited signal for providing an output signal, and a mixer for multiplying said output signal and a delayed representation of said limited signal for providing said feedback signal, whereby said signal-to-jamming ratio of said output signal is improved with respect to said input signal; and a despreader/decoder coupled to the jamming signal cancellation apparatus for despreading and decoding said output signal.

12. The receiver of claim 11, wherein:

the jamming signal cancellation apparatus further includes a feedback loop for coupling said difference signal to said amplitude adjuster for adjusting said amplitude.

13. The receiver of claim 11, wherein:

said spread spectrum signal is a code division multiple access (CDMA) signal.

14. The receiver of claim 11, wherein:

said spread spectrum signal is a global positioning system (GPS) signal.

15. The receiver of claim 11, wherein:

said spread spectrum signal is a global orbiting navigational system (GLONASS) signal.

\* \* \* \* \*